US011936117B2

(12) United States Patent
Forslund

(10) Patent No.: US 11,936,117 B2
(45) Date of Patent: Mar. 19, 2024

(54) DUAL-BAND MULTIMODE ANTENNA FEED

(71) Applicant: SAAB AB, Linköping (SE)

(72) Inventor: Ola Forslund, Sundbyberg (SE)

(73) Assignee: SAAB AB, Linköping (SE)

( * ) Notice: Subject to any disclaimer, the term of this patent is extended or adjusted under 35 U.S.C. 154(b) by 373 days.

(21) Appl. No.: 17/436,181

(22) PCT Filed: Mar. 4, 2019

(86) PCT No.: PCT/SE2019/050182
§ 371 (c)(1),
(2) Date: Sep. 3, 2021

(87) PCT Pub. No.: WO2020/180220
PCT Pub. Date: Sep. 10, 2020

(65) Prior Publication Data
US 2022/0352650 A1 Nov. 3, 2022

(51) Int. Cl.
*H01Q 25/04* (2006.01)
*H01P 1/16* (2006.01)
*H01P 1/213* (2006.01)
*H01Q 13/02* (2006.01)
*H01Q 15/22* (2006.01)

(52) U.S. Cl.
CPC ............... *H01Q 25/04* (2013.01); *H01P 1/16* (2013.01); *H01P 1/2131* (2013.01); *H01Q 13/025* (2013.01); *H01Q 15/22* (2013.01)

(58) Field of Classification Search
None
See application file for complete search history.

(56) References Cited

U.S. PATENT DOCUMENTS 3,308,469 A 3/1967 Drabowitch
4,241,353 A 12/1980 Salvat et al.
(Continued)

FOREIGN PATENT DOCUMENTS

DE 2626926 A1 12/1977
GB 2137428 A 10/1984

OTHER PUBLICATIONS

International Search Report and Written Opinion dated Nov. 15, 2019 for International Application No. PCT/SE2019/050182, 12 pages.
(Continued)

*Primary Examiner* — Kenneth B Wells
(74) *Attorney, Agent, or Firm* — Sage Patent Group

(57) ABSTRACT

Provided is a dual-band multimode antenna feed for a high-frequency band and a low-frequency band. The feed includes four high-frequency waveguide ports, where each high-frequency waveguide port is connected to a respective high-frequency input/output waveguide. Each high-frequency input/output waveguide includes a high-frequency waveguide aperture facing a first section for mixing electromagnetic modes in the E-plane. The first section is connected to a second section for mixing electromagnetic modes in the H-plane. The feed further includes a low-frequency waveguide port connected to a low-frequency input/output waveguide. A filter is arranged inside the first section to be transparent for plane wave modes exhibited at lower frequencies and reflecting for plane wave modes exhibited at higher frequencies.

15 Claims, 10 Drawing Sheets

(56) References Cited

U.S. PATENT DOCUMENTS

| | | | | |
|---|---|---|---|---|
| 4,357,612 | A | 11/1982 | Salvat et al. | |
| 5,066,959 | A | 11/1991 | Huder | |
| 6,831,613 | B1 * | 12/2004 | Gothard | H01Q 19/19 343/781 CA |
| 11,444,384 | B2 * | 9/2022 | Fraysse | H01Q 13/0225 |
| 2005/0007289 | A1 | 1/2005 | Zarro et al. | |
| 2016/0254601 | A1 | 9/2016 | Runyon et al. | |

OTHER PUBLICATIONS

J. Lidvall et al., "Broadband Multimode Feed for Monopulse Tracking Antenna", Proc. 18th European Microwave Conference, Sep. 12-15, 1988, Stockholm, Sweden, pp. 500-505 (6 pages).

H. Bayer et al., "A Dual-Band Multimode Monopulse Tracking Antenna for Land-Mobile Satellite Communications in Ka-Band", 6th European Conference on Antennas and Propagation (EUCAP), Mar. 26-30, 2012, Prague, Czech Republic, pp. 2357-2361 (5 pages).

Extended European Search Report dated Sep. 20, 2022 for European Patent Application No. 19918331.0, 5 pages.

* cited by examiner

DUAL-BAND MULTIMODE ANTENNA FEED

CROSS-REFERENCE TO RELATED APPLICATIONS

This application is a 35 U.S.C § 371 national stage application for International Application No. PCT/SE2019/050182, entitled "DUAL-BAND MULTIMODE ANTENNA FEED", filed on Mar. 4, 2019, the disclosures and contents of which are hereby incorporated by reference in their entireties.

TECHNICAL FIELD

The application relates to a dual-band multimode antenna feed for a high-frequency band and a low-frequency band. The feed comprises four high-frequency waveguide ports, each high-frequency waveguide port being connected to a respective high-frequency input/output waveguide. Each high-frequency input/output waveguide has a high-frequency waveguide aperture facing a first section for mixing electromagnetic modes in the E-plane. The first section is connected to a second section for mixing electromagnetic modes in the H-plane. The application also relates to providing an antenna feed.

BACKGROUND ART

So called monopulse-techniques are used in many types of antennas where accurate position estimation of objects is required. Position estimation is obtained by generation of so called sum- and difference radiation patterns simultaneously in different antenna channels. Thus the term mono-pulse; in theory, the position of an object can be determined by one radar-pulse only, see e.g. A. I. Leonov, K. I. Fomichev, "Monopulse Radar" Artech House, 1986. In particular monopulse-techniques are used in reflector antenna systems for tracking radars where one sum-channel and two difference channels, one in azimuth, and one in elevation, are used. Sum- and difference channels are usually obtained by forming different linear combinations of four input/output waveguides. Techniques for position estimation based on sum- and difference radiation patterns can be used also for passive systems.

A particular advantageous way of obtaining reflector antenna feeds with good radiation properties (low side lobes etc.) in both, sum- and difference channels is to use multimode waveguide techniques in the feed. Such techniques were originally described in S. Drabowitch, "Théorie et Applications des Antennes Multimodes", Revue Technique CFTH, no 37, November 1962 and further in S. W. Drabowitch, "Multimode Antennas", Microwave Journal, January 1966.

One design for three channels involves mixing modes in two consecutive waveguide sections, one where modes are mixed with respect to the E-plane, and one where modes are mixed with respect to the H-plane. Waveguide modes relevant for mixing with respect to E-plane are $TE_{10}$, $TE_{11}$, $TM_{11}$, $TE_{21}$ and $TM_{21}$. Waveguide modes relevant for mixing with respect to the H-plane are $TE_{10}$, $TE_{20}$ and $TE_{30}$.

Design of the three channel feed is elaborated upon in conference publication U. Lidvall, M. Persson, G. Larsson, "Broadband Multimode Feed for Monopulse Tracking Antenna", Proc. 18th European Microwave Conference, 1988, 500-505. Such a feed designed for three channels is however a complex device and it is not easy to e.g. implement dual frequency band operation in such a feed.

In a reflector system antenna, where two different frequency bands use the same aperture, a tracking radar function can be provided by an internal feed. The internal feed is a three channel monopulse multimode feed as described above. The internal feed illuminates a hyperbolic polarisation selective subreflector which has one of its focal points collocated with the internal feed. The frequency selective main reflector is polarisation twisting at the frequency band of the internal feed. The other focal point of the subreflector coincides with the parabolic main reflector's focal point where a feed for another frequency band is located; for the frequency band and polarization of this feed the subreflector is "not seen"; the wave reaching the main reflector is not polarisation twisted.

There are several drawbacks of this solution:

The antenna is bulky and support struts are fragile. De-icing equipment is required to keep support struts free from ice.

Support struts and eternal antennas cause blockage and increase side-lobe levels.

Long waveguides are required.

There is thus a need for improvement in the field of antenna feeds.

SUMMARY

An object of this disclosure is to provide a dual-band multimode antenna feed that addresses the problems described above. This object is achieved by the technical features contained in the characterizing portion of independent claims 1 and 12. The dependent claims contain advantageous embodiments, further developments and variants of the antenna feed.

The disclosure relates to a dual-band multimode antenna feed for a high-frequency band and a low-frequency band. The low frequency band can e.g. be a subset of the X-band, between 8 and 12 GHz. The high frequency band ca e.g. be a subset of the Ku-band, between 12 and 18 GHz. The feed comprises four high-frequency waveguide ports, each high-frequency waveguide port being connected to a respective high-frequency input/output wave-guide. Each high-frequency input/output waveguide has a high-frequency waveguide aperture facing a first section for mixing electromagnetic modes in the E-plane. The first section is connected to a second section for mixing electromagnetic modes in the H-plane. The feed further comprises a low-frequency waveguide port connected to a low-frequency input/output waveguide, wherein a low-frequency waveguide aperture faces the first section. A filter is arranged inside the first section, where the filter is arranged to be transparent for plane wave modes exhibited at lower frequencies and reflecting for plane wave modes exhibited at higher frequencies. Waveguide modes can be seen as a superposition of plane wave modes or Floquet waves and are known in the art of electromagnetic wave propagation in periodic structures.

One advantage with an antenna feed according to the disclosure is that it enables a compact reflector antenna system involving two frequency bands. No external feed arrangements with support struts, de-icing equipment and similar are needed. The antenna feed combining two frequency bands further provides better side lobe performance due to no external feed arrangements and support struts. No long waveguides are required with the antenna feed.

The filter may be a plane-wave band-pass/band-stop filter. The filter can be adapted to be transparent for different frequency bands.

The filter may consist of periodically repeating cells and comprises at least one cell comprising electrically connected conducting patterns arranged on opposite sides of a dielectric sheet.

Each conducting patterns may be a cross with crossbars at its four ends surrounded by a rectangular frame. In the conducting pattern, a central part of the conducting pattern may be a cross with crossbars at its four ends, similar to a cross potent. One advantage with this feature is that it provides an advantageous separation between the passband and the stopband. The rectangular frame achieves the passband together with the central part. The central part achieves the stopband. The central part and the rectangular frame are not in electrical connection with each other, but the patterns on the opposite sides of the dielectric sheet are electrically connected by at least one via or vertical interconnect access.

The low-frequency wave-guide port and waveguide may be arranged centrally in the feed. Thereby, an up/down and left/right symmetry of the antenna feed is achieved.

An aperture size of each high-frequency waveguide aperture of each high-frequency input/output waveguide facing the first section may be reduced by an inductive diaphragm at a boundary of the first section. It is advantageous to reduce the size of the four high-frequency waveguide apertures corresponding to the upper frequency band relative to the sizes of the prior art antenna feed in order to be able to match the waveguide for the lower frequency band. Furthermore the reduced size of the high-frequency apertures improves isolation between the low frequency waveguide and the four high frequency waveguides.

The aperture size of the high-frequency waveguide apertures of the high-frequency input/output waveguides may be reduced such that a cut-off frequency of the fundamental mode corresponding to the aperture size of the high-frequency waveguide apertures of the high-frequency input/output waveguides is higher than the upper frequency limit of the low-frequency band. This is advantageous in order to match the low frequency band.

The aperture size of the low-frequency waveguide aperture of the low-frequency input/output waveguides may be reduced by an inductive diaphragm. This enables good mode mixing in the E-plane cavity and thereby good radiation patterns at the high-frequency band with respect to the E-plane. This is further done to maintain the conditions of the original design as closely as possible. One reason for this is that some of the modes existing in the first section are degenerate: TE21, TM21, TE11 and TM11; the former two are even modes relevant for sum patterns with respect to E-plane; the latter two are odd modes relevant for difference patterns with respect to E-plane. When exciting these modes, their relative phase and amplitude have to be correct and this is governed by boundary conditions at the beginning and end of the first section; the phase between the different modes is independent of the length of the first section because they have the same propagation constants. Thus the phase relation between these pair of modes cannot be tuned by changing the length of the first section.

The cut-off frequency of the fundamental mode corresponding to the aperture size of the high-frequency waveguide apertures of the high-frequency input/output waveguides may be close to or within the high-frequency band. This is done in order to be able to accommodate and match the low frequency band.

The aperture size of the low-frequency waveguide aperture of the low-frequency input/output waveguides may be reduced such that the cut-off frequency for the fundamental mode is above, within or just below the frequency band of operation for the low-frequency band. This enhances the advantages described above. Normally for a waveguide, the nominal frequency band is significantly higher than the cut-off frequency. For the standard waveguide IEC R100, the cut-off frequency is 6.56 GHz and the lower limit for the nominal band is 8.2 GHz.

An interface between the first section and the second section may comprise inductive diaphragms. In the present antenna feed the second section or H-plane section comprising at least four different waveguide cavities begins directly after the first section or E-plane section; there is no overlap. These diaphragms enable good radiation patterns at the high-frequency band with respect to H-plane.

The disclosure also relates to a reflector antenna system comprising a polarization selective subreflector and a polarization twisting main reflector and an antenna feed according to the above. The antenna feed makes it possible to design a reflector antenna with a high-frequency band and a low-frequency band without needing external equipment on the radar. One advantage with a reflector antenna comprising an antenna feed according to the above is that the internal focal point can be used for both the high-frequency and the low-frequency bands, thereby reducing the need for two separate antenna feeds.

The disclosure also relates to a method of providing an antenna feed, where the method comprises:

- providing four high-frequency waveguide ports, each high-frequency waveguide port being connected to a respective high-frequency input/output waveguide,
- providing each high-frequency input/output waveguide with a high-frequency wave-guide aperture facing a first section for mixing electromagnetic modes in the E-plane,
- providing a second section for mixing electromagnetic modes in the H-plane being connected to the first section, where the method also comprises:
- providing a low-frequency waveguide port connected to a low-frequency input/output waveguide,
- providing a low-frequency waveguide aperture facing the first section,
- arranging a filter inside the first section, where the filter is arranged to be transparent for plane wave modes exhibited at lower frequencies and reflecting for plane wave modes exhibited at higher frequencies.

The method may further comprise:

- arranging the low-frequency waveguide port and low-frequency input/output waveguide centrally in the feed.

The method may further comprise:

- reducing an aperture size of each high-frequency waveguide aperture of each high-frequency input/output waveguide facing the first section by arranging inductive diaphragms at a boundary of the first section.

The method may further comprise:

- reducing an aperture size of a low-frequency waveguide aperture of a low-frequency input/output waveguide facing the first section by arranging an inductive diaphragm at a boundary of the first section.

The method may further comprise:

- providing an interface between the first section and the second section with inductive diaphragms.

DETAILED DESCRIPTION

In the description, references to the E-plane and H-plane are made. The E-plane is the plane along which the electric field has its polarisation. The H-plane is the plane along which the magnetic field has its polarisation.

Figure 1:
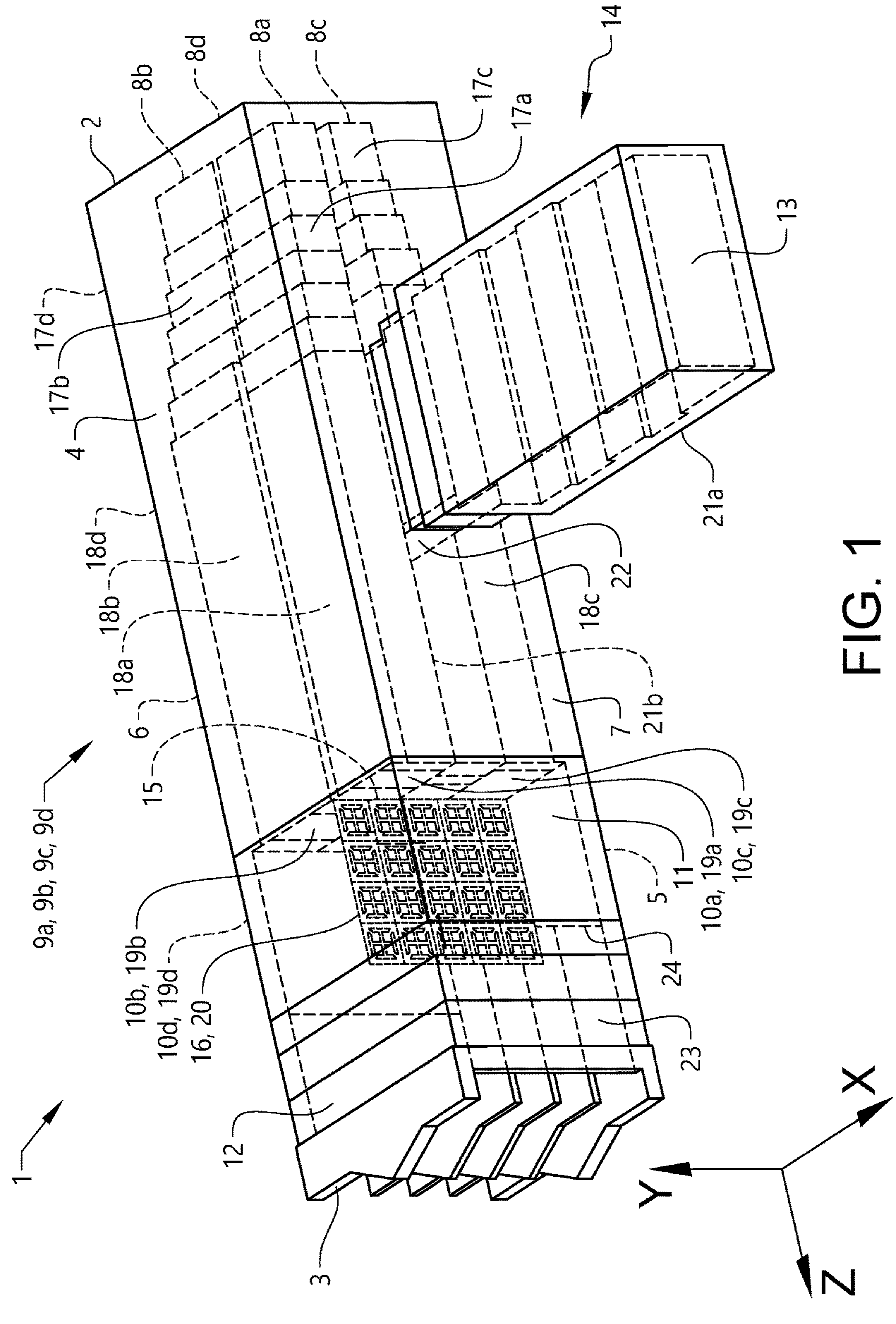
FIG. 1 schematically shows a perspective view of an antenna feed according to the disclosure, FIG. 2 schematically shows a cross section of the antenna feed according to the disclosure along the x-y plane, FIG. 3 schematically shows a cross section of the antenna feed according to the disclosure along the y-z plane, FIG. 4 schematically shows a cross section of the antenna feed according to the disclosure along the x-z plane, FIG. 5 schematically shows a filter comprising a grid of 4×5 periodic filter cells, FIG. 6 schematically shows a periodic filter cell of the filter of FIG. 5.

FIG. 1 schematically shows a perspective view of an antenna feed 1 according to the disclosure. The antenna feed 1 is a dual-band multimode antenna feed for a high-frequency band and a low-frequency band. The antenna feed 1 has a length extension along a z-axis, a height extension along a y-axis and a width extension along an x-axis. The antenna feed 1 has a rear end 2, a front end 3, an upper side 4, a lower side 5, a right side 6 and a left side 7. The axes are intended to be used to describe the positions of the antenna feed's 1 different features relative each other and should not be seen as an indication of how the antenna feed 1 is arranged in use. The interior parts of the antenna feed 1 are illustrated by dashed outlines.

The antenna feed 1 comprises four high-frequency waveguide ports 8*a*, 8*b*, 8*c*, 8*d* arranged at the rear end 2 of the antenna feed 1. Each high-frequency waveguide port 8*a*, 8*b*, 8*c*, 8*d* is connected to a respective high-frequency input/output waveguide 9*a*, 9*b*, 9*c*, 9*d*. Each high-frequency input/output waveguide 9*a*, 9*b*, 9*c*, 9*d* comprises a high-frequency waveguide aperture 10*a*, 10*b*, 10*c*, 10*d* facing a first section 11, or E-plane section, for mixing electromagnetic modes in the E-plane. The first section 11, is connected to a second section 12, or H-plane section, for mixing electromagnetic modes in the H-plane. The second section 12 is arranged at the front end 3 of the antenna feed 1.

The antenna feed 1 also comprises a low-frequency waveguide port 13 connected to a low-frequency input/output waveguide 14. A low-frequency waveguide aperture 15 faces the first section 11. A filter 16 is further arranged inside the first section 11, where the filter 16 is arranged to be transparent for plane wave modes exhibited at lower frequencies and reflecting for plane wave modes exhibited at higher frequencies. Waveguide modes can be seen as a superposition of plane wave modes or Floquet waves. In this way, the same aperture can be used by two frequency bands, one band involving three antenna channels for monopulse measurements and one channel at a lower frequency band used for other purposes.

The four high-frequency waveguide ports 8*a*, 8*b*, 8*c*, 8*d* are arranged in a 2×2 grid where a first high-frequency waveguide port 8*a* is arranged at an upper left position, a second high-frequency waveguide port 8*b* is arranged at an upper right position, a third lower high-frequency waveguide port 8*c* is arranged at a lower left position and a fourth high-frequency waveguide port is arranged at a lower right position 8*d*. All positions are seen from the rear end 2 of the antenna feed 1. The positions of the high-frequency waveguide ports 8*a*, 8*b*, 8*c*, 8*d* are thus the same as in the prior art antenna feed.

Each high-frequency input/output waveguide 9*a*, 9*b*, 9*c*, 9*d* comprises a sloping high-frequency waveguide part 17*a*, 17*b*, 17*c*, 17*d* and a horizontal high-frequency waveguide part 18*a*, 18*b*, 18*c*, 18*d*. The high-frequency input/output waveguides 9*a*, 9*b* connected to the first and second high-frequency waveguide ports 8*a*, 8*b* comprise first and second upward sloping high-frequency waveguide parts 17*a*, 17*b* respectively, each connected to a first and second horizontal high-frequency waveguide part 18*a*, 18*b*. Similarly, the high-frequency input/output waveguides 9*c*, 9*d* connected to the third and fourth high-frequency waveguide ports 8*c*, 8*d* comprise third and fourth downward sloping high-frequency waveguide parts 17*c*, 17*d* respectively, each connected to a third and fourth horizontal high-frequency waveguide part 18*c*, 18*d*. Horizontal in this case refers to the fact that the high-frequency waveguide parts 18*a*, 18*b*, 18*c*, 18*d* do not change their height over their extension along the z-axis. The sloping high-frequency waveguide parts 17*a*, 17*b*, 17*c*, 17*d* creates a space (shown in FIG. 2) in which a low-frequency waveguide can be arranged. This is described in more detail below.

The first and second horizontal high-frequency waveguide parts 18*a*, 18*b* connect to first and second high-frequency waveguide apertures 10*a*, 10*b* facing the first section 11. The third and fourth horizontal high-frequency waveguide parts 18*c*, 18*d* connect to third and fourth high-frequency waveguide apertures 10*c*, 10*d* facing the first section 11. An aperture size of each of the first, second, third and fourth high-frequency waveguide apertures 10*a*, 10*b*, 10*c*, 10*d* of each high-frequency input/output waveguide 9*a*, 9*b*, 9*c*, 9*d* facing the first section 11 are reduced by a respective first, second, third and fourth inductive diaphragm 19*a*, 19*b*, 19*c*, 19*d* at a boundary between each waveguide 9*a*, 9*b*, 9*c*, 9*d* and the first section 11.

The low-frequency input/output waveguide 14 comprises a first horizontal low-frequency waveguide part 21*a*, an angled low-frequency waveguide part 22 and a second horizontal low-frequency waveguide part 21*b*. The low-frequency waveguide port 13 is connected to the first horizontal low-frequency waveguide part 21*a* which is arranged along the x-axis. The low-frequency waveguide port 13 and first horizontal low-frequency waveguide part 21*a* is in this example arranged on the left side 7 of the antenna feed 1, at approximately 90° angle relative to the high-frequency waveguide ports 8*a*, 8*b*, 8*c*, 8*d*. The low-frequency waveguide port 13 and first horizontal low-frequency waveguide part 21*a* can also be arranged on the left side 7 of the antenna feed 1, at an angle different from 90° relative to the high-frequency waveguide ports 8*a*, 8*b*, 8*c*, 8*d* depending on the antenna feed design.

The low-frequency waveguide port 13 and first horizontal low-frequency waveguide part 21*a* is arranged close to the rear end of the left side 7, as seen along the y-axis, i.e. that the first horizontal low-frequency waveguide part 21*a* connects to the left side 7 having an equal height of the low-frequency waveguide part 21*a* positioned on each side of the plane bisecting the antenna feed 1 along the x-z plane. The low-frequency waveguide port 13 and first horizontal low-frequency waveguide part 21*a* can also be arranged on the right side 6 of the antenna feed 1.

The first horizontal low-frequency waveguide part 21*a* is in turn connected to an angled low-frequency waveguide part 22 changing the direction of the waveguide from extending along the x-axis to the z-axis. The angled low-frequency waveguide part 22 is connected to a second horizontal low-frequency waveguide part 21*b* arranged along the z-axis. The second horizontal low-frequency waveguide part 21*b* connects to the low-frequency waveguide aperture 15 facing the first section 11. The antenna feed 1 has an extension somewhat longer along the z-axis than the prior art antenna feed in order for the angled low-frequency waveguide 22 part to fit. The angled low-frequency waveguide part 22 is placed as far back as possible in the antenna feed, in the space created by the sloping high-frequency parts 17*a*, 17*b*, 17*c*, 17*d*.

An aperture size of the low-frequency waveguide aperture 15 facing the first section 11 is reduced by a fifth inductive diaphragm 19*e* at a boundary between the waveguide aperture 15 and the first section 11.

The sloping high-frequency waveguide parts 17*a*, 17*b*, 17*c*, 17*d* allow the low-frequency input/output waveguide 14 to be arranged between the four high-frequency horizontal waveguide parts 18*a*, 18*b*, 18*c*, 18*d*, thereby making it possible to maintain the size of the antenna feed 1 with respect to the extension along the x- and y-axes In the first section 11, or E-plane section, a filter 16 comprising a grid of 4×5 periodic cells 20 is placed. In the prior art antenna feed, the first section 11 comprised an internal metallic wall. This wall is replaced by the filter 16 which is transparent for plane wave modes exhibited at lower frequencies and reflecting for plane wave modes exhibited at higher frequencies. The first section 11 thus comprises two cavities separated by the filter 16. The filter 16 has an extension along the y-axis and the z-axis. Each cell 20 comprises an electrically connected conducting pattern arranged on opposite sides of a dielectric sheet.

The prior art antenna feed comprises an overlapping section between the E-plane section and the H-plane section. This section consists of eight waveguides in parallel. The purpose of this section is to enter and excite the H-plane section in a favourable manner. Since these waveguides inevitably would be cut-off at the lower frequency band the overlap has to be removed.

In the present application, second section waveguides 23, or H-plane waveguides, in the second section 12 are arranged facing the first section 11. The second section 12 comprises at least 4 parallel H-plane waveguides 23 arranged to mix the H-plane modes, similar to the prior art antenna feed. Inductive second section diaphragms 24 are inserted at the beginning of each second section waveguide 23 in the second section 12 and the second section 12 thus begins directly after the first section 11; there is no overlap as in the prior art antenna feed. The function of the diaphragms 24 is to obtain good radiation patterns at the upper frequency band with respect to the H-plane and they replace the overlapping section between the first and second sections in the prior art design.

Figure 2:
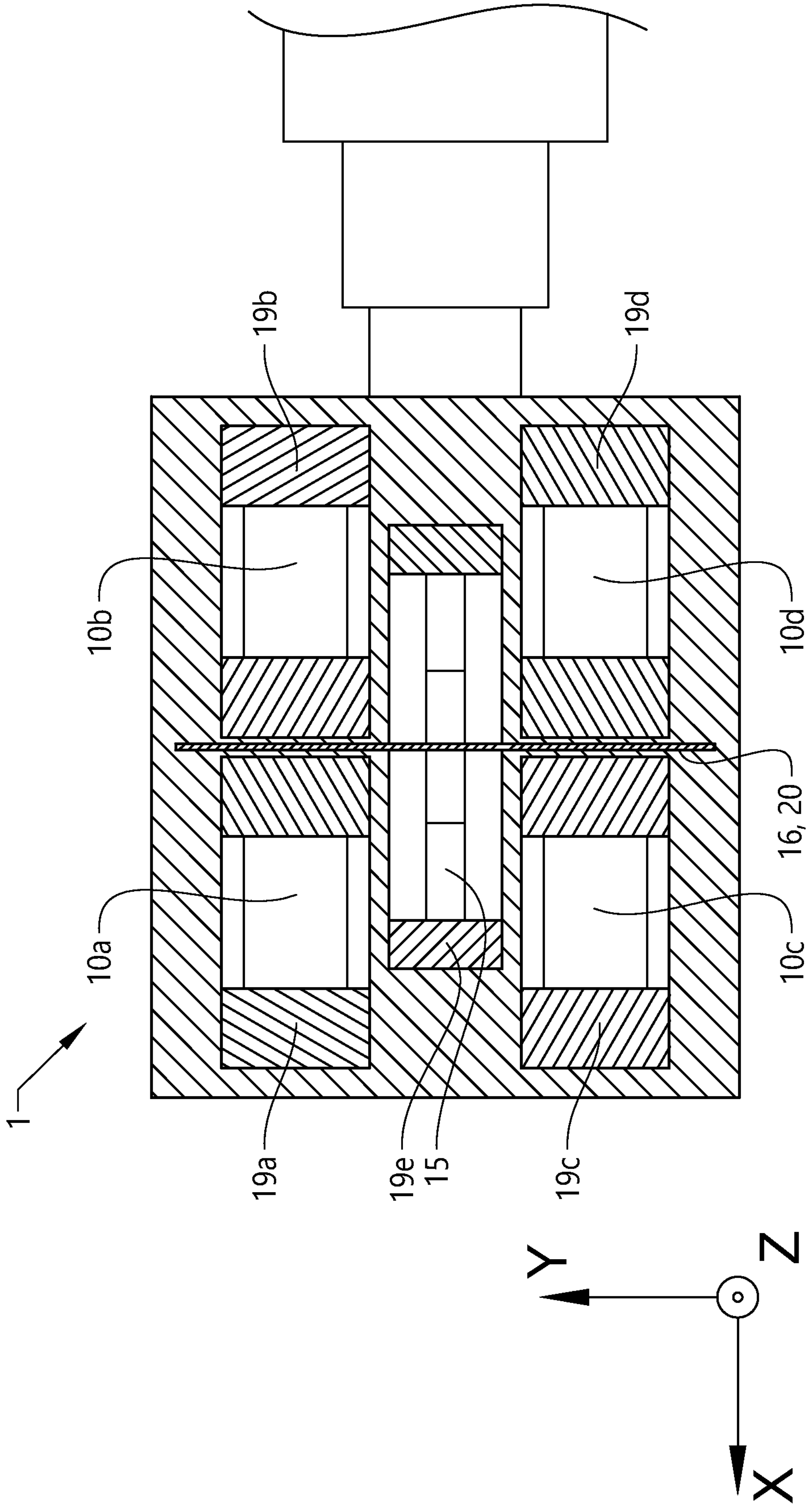

FIG. 2 schematically shows a cross section of the antenna feed 1 according to the disclosure along the x-y plane. In FIG. 2, the reduction in size of the high-frequency waveguide apertures 10*a*, 10*b*, 10*c*, 10*d* by the inductive first section diaphragms 19*a*, 19*b*, 19*c*, 19*d* can be seen. Also, the reduction in size of the low-frequency waveguide aperture 15 by the fifth inductive first section diaphragm 19*e* is seen.

In the example shown in FIG. 2, the aperture sizes of the high-frequency waveguide apertures 10*a*, 10*b*, 10*c*, 10*d* are reduced to 56% of their original sizes, from 16 mm to 9, leading to that the cut-off frequency of the fundamental mode corresponding to the aperture size of the high-frequency waveguide apertures is increased from 9.375 GHZ to 16.67 GHz.

In the example, the aperture size of the low-frequency waveguide aperture is reduced to 78% of its original size, from 22.8 mm to 17.8 mm. The cut-off frequency of the fundamental mode corresponding to the aperture size of the low-frequency waveguide aperture is thereby increased from 6.585 GHz to 8.426 GHz. The characteristics for the high-frequency band (the mode generation in the E-plane cavity and thereby the radiation patterns with respect to the E-plane) are improved the more this aperture size is reduced. In order for the cut-off frequency to be increased to within the low-frequency band of operation, the aperture would have to be reduced to approximately 15.0 mm.

Figure 3:
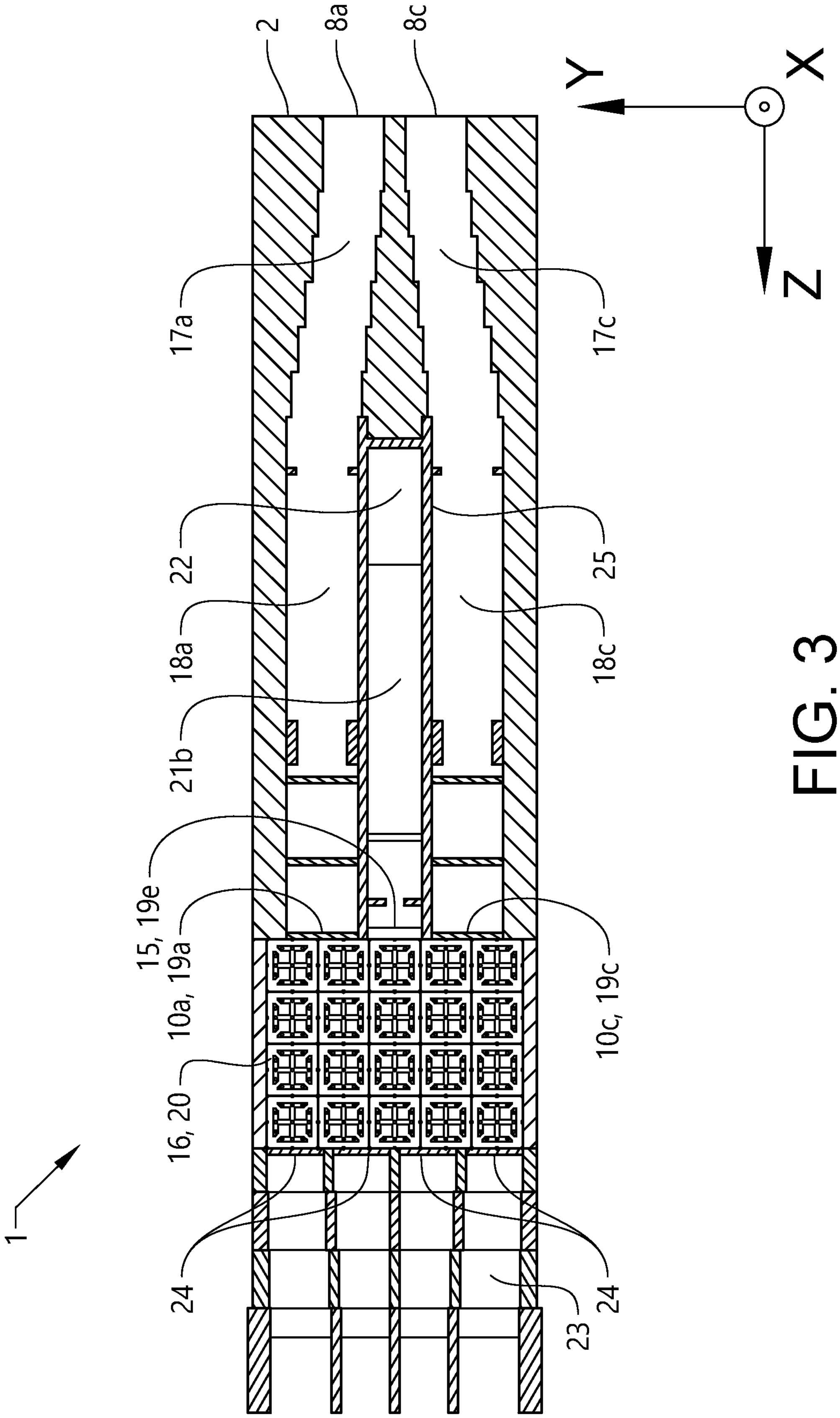

FIG. 3 schematically shows a cross section of the antenna feed 1 according to the disclosure along the y-z plane. In FIG. 3, the first and third sloping high-frequency waveguide parts 17*a*, 17*c* are shown, sloping upwards and downwards respectively. The angled low-frequency waveguide part 22 and second low-frequency horizontal waveguide part can be seen placed in a space 25 created between the first and third horizontal high-frequency waveguide parts 18*a*, 18*c*. The first, third and fifth inductive diaphragms 19*a*, 19*c*, 19*e* are also seen facing the first section 11. The inductive second section diaphragms 24 are also seen at the beginning of the second section waveguides 23. The filter 16 can also be seen placed in the first section.

Figure 4:
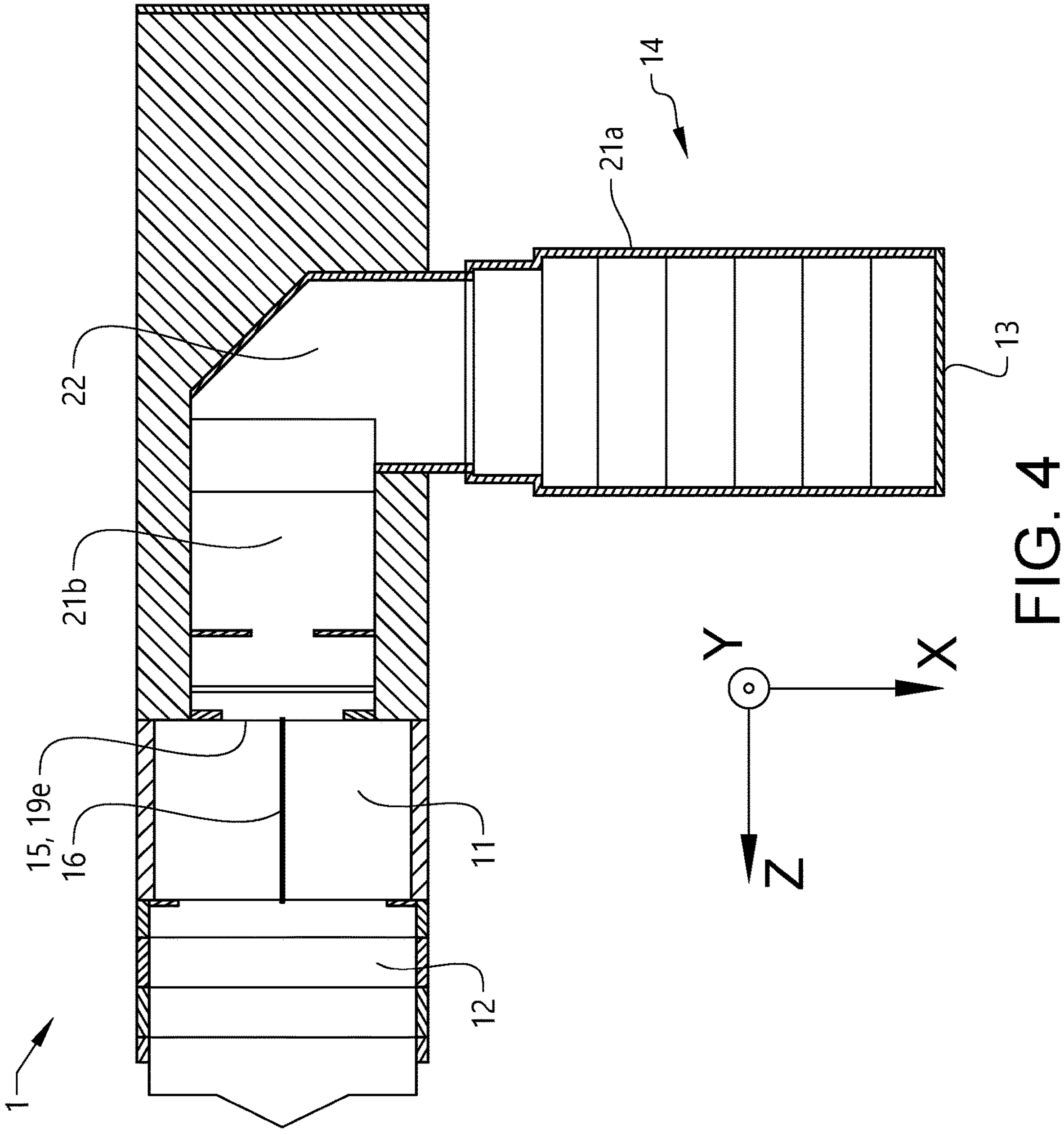

FIG. 4 schematically shows a cross section of the antenna feed 1 according to the disclosure along the x-z plane. In FIG. 4, the first and second horizontal low-frequency waveguide parts 21*a*, 21*b* are shown, interconnected by the angled low-frequency waveguide part 22. The second horizontal low-frequency waveguide part 21*b* and thereby also the low-frequency waveguide aperture 15 is placed centrally in the antenna feed 1, meaning that the low-frequency waveguide aperture 15 is placed such that the low-frequency waveguide aperture 15 has an equal height of the aperture positioned on each side of the plane bisecting the antenna feed 1 along the x-z plane and an equal width of the aperture positioned on each side of the plane bisecting the antenna feed 1 along the y-z plane. Although the low-frequency waveguide port 13 and first horizontal low-frequency waveguide part 21*a* enters the antenna feed 1 from the left side 7, due to the distance between the low-frequency waveguide port 13 and the low-frequency wave-guide aperture 15, the effect of the asymmetric placement of the low-frequency waveguide port 13 and first horizontal low-frequency waveguide part 21*a* has subsided and the up/down and left/right symmetry of the antenna feed 1 is maintained. The inductive diaphragm 19*e* at the interface between the low-frequency waveguide and the E-plane section is shown.

Figure 5:
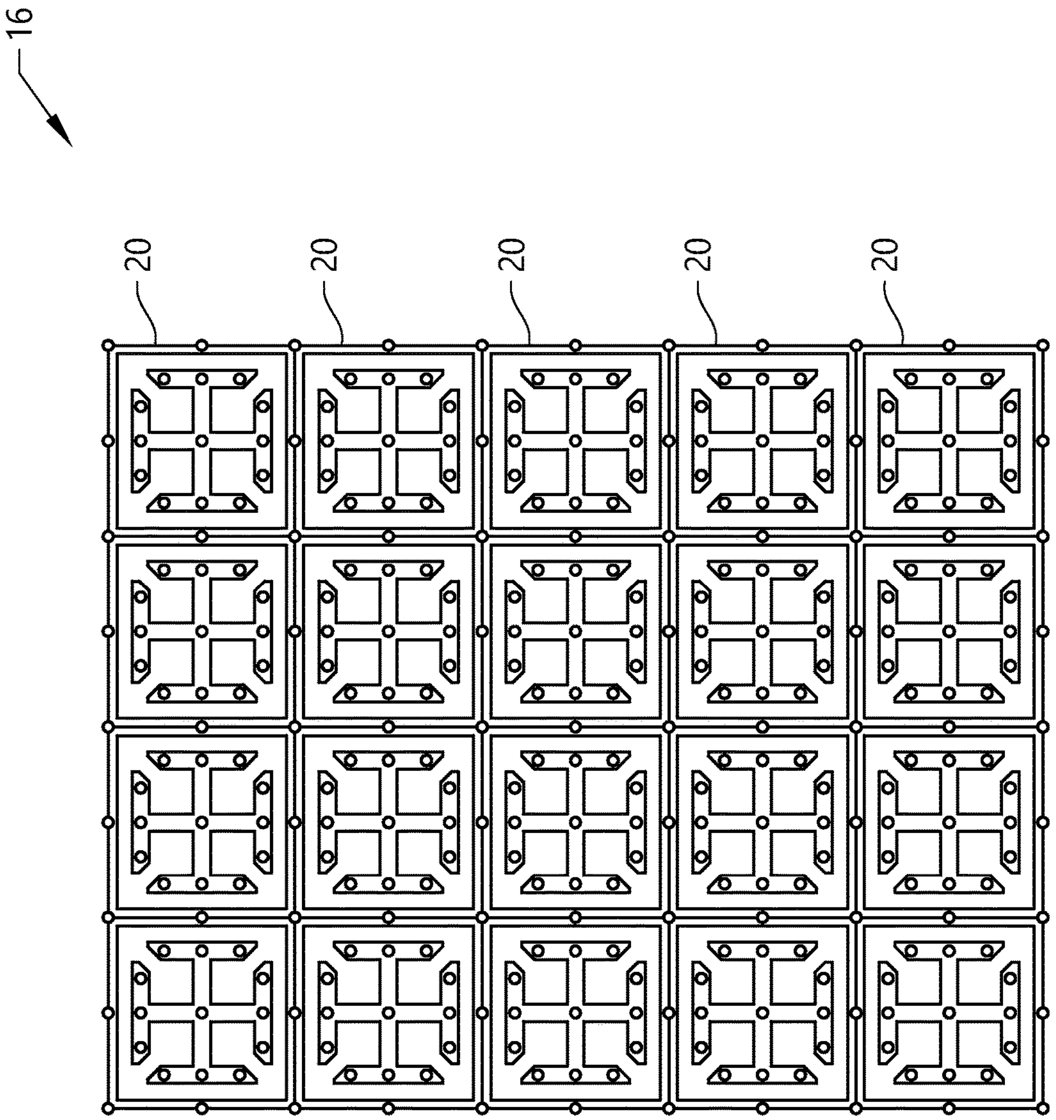

FIG. 5 schematically shows a filter 16 comprising a grid of 4×5 periodic filter cells 20 according to an example embodiment. The grid size of the filter 16 is an illustration and can be changed depending on the desired specifications of the antenna feed 1.

Figure 6:
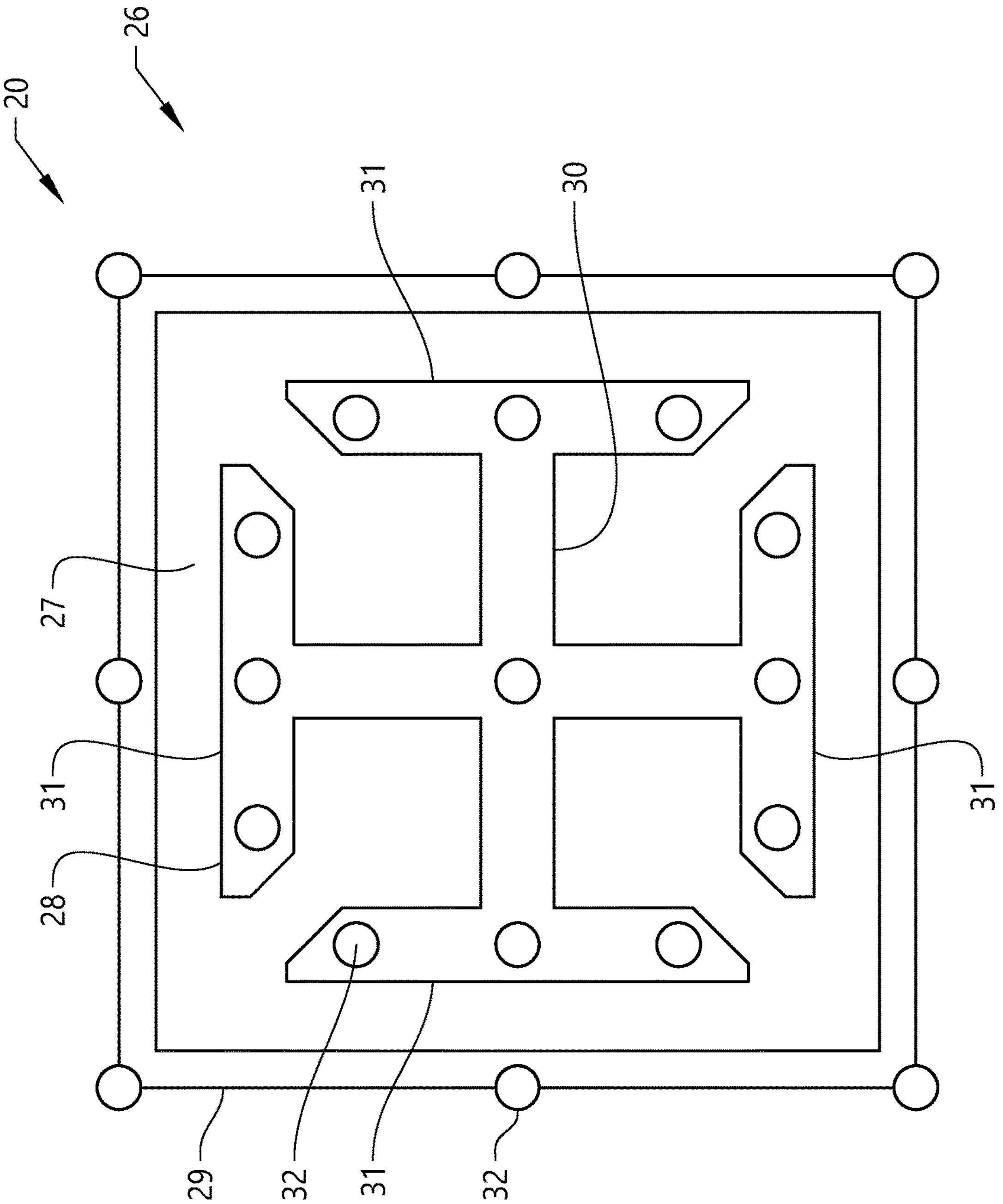

FIG. 6 schematically shows a periodic filter cell 20 of the filter 16 of FIG. 5. Each cell 20 comprises an electrically connected conducting pattern 26 arranged on opposite sides of a dielectric sheet 27. The conducting pattern 26 comprises a central part 28 and a frame 29. The central part 28 is in the form of a cross 30 with crossbars 31 at its four ends, similar to a cross potent. The crossbars 31 can be bevelled or chamfered at the ends or have a 90° angle at each end. The central part 28 is surrounded by the rectangular frame 29. The central parts 28 on each side of the dielectric sheet 27 are connected to each other by at least one via 32. The rectangular frames 29 on each side of the dielectric sheet 27 are connected to each other by at least one via 32. The central part 28 and the frame 29 not electrically connected to each other. The filter topology shown with a conducting surrounding frame and an isolated conducting central element typically provides a band-pass/band-stop filter response.

The dielectric sheet has a thickness of between 0.1 and 1 mm. The height along the y-axis and the width along the z-axis of one cell is dependent on the wavelength the filter is designed for and is typically between 0.1 and 0.7 times the wavelength. According to one example, the cell has a size of 5.55 mm along the z-axis and 5.44 mm along the y-axis. The cross 30 is 4.1 mm long along the z-axis and 4.05 mm long along the y-axis. The dimensions of the cross are such that it is reflecting across the high-frequency band. The dimensions of the frame and cross together are such that transmission is obtained across the low frequency band.

The surrounding frame can e.g. be omitted giving another type of filter response (pure band-stop). The central part can also have another shape, it can e.g. be a cross without bars or shaped as a rectangular patch changing the filter characteristics shown in FIGS. 7*a*-10*d*. The number of cells can be altered but it must be of type M×N where M and N are integers.

Figure 7A:
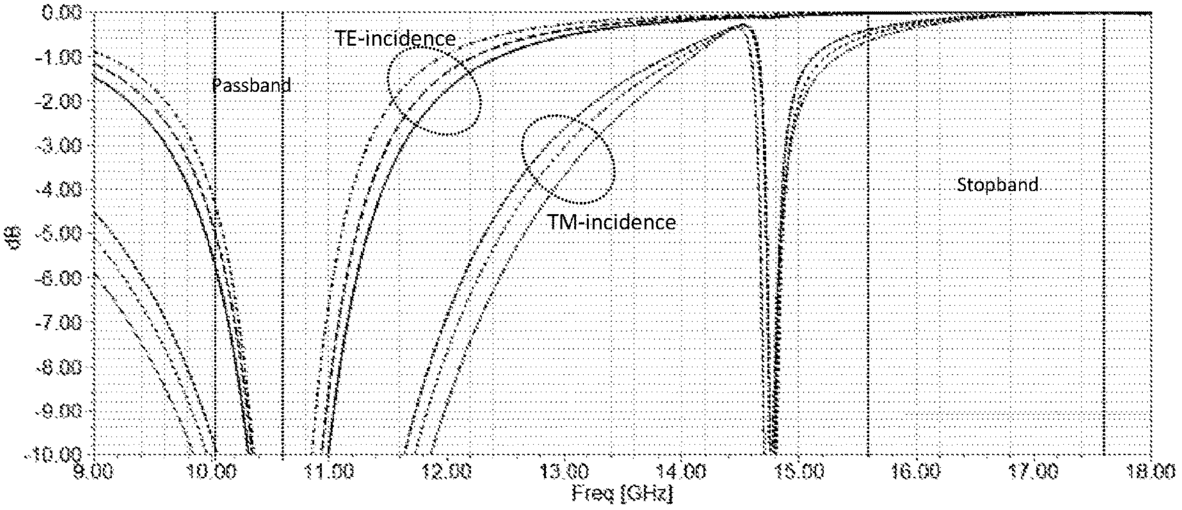
FIGS. 7*a* and 7*b* shows the filters characteristics for refection and transmission (assuming plane waves and an infinitely large periodic structure of the filter)
Figure 7B:
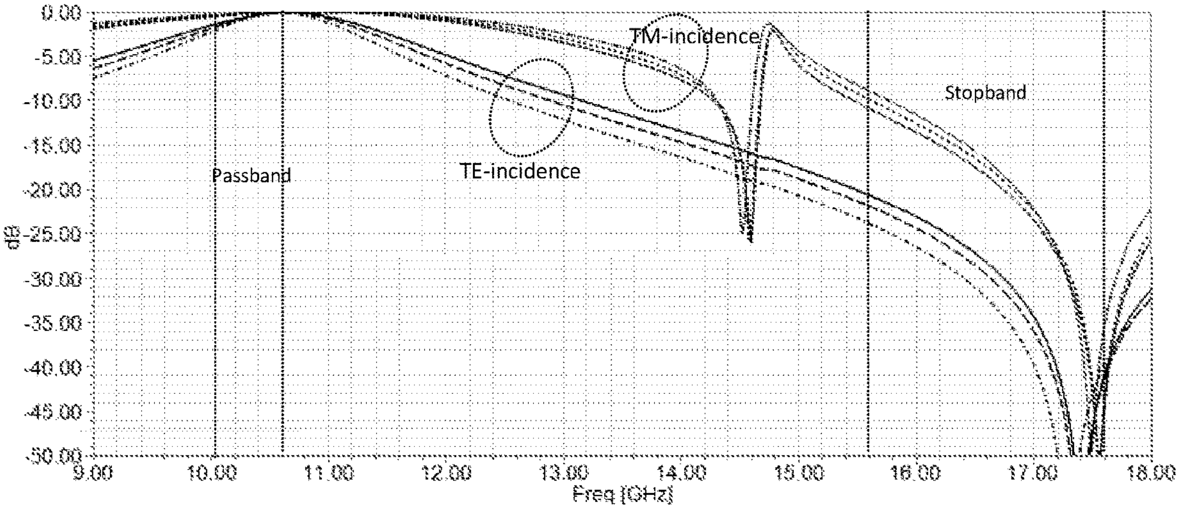

FIGS. 7*a* and 7*b* show the filter's 16 characteristics for reflection (FIG. 7*a*) and transmission (FIG. 7*b*) (assuming plane waves and an infinitely large periodic structure of the filter 16). Curves corresponding to plane wave incidence angles, 55°, 60°, and 65° with respect to a vector normal to the filter surface are shown for TE-incidence and TM-incidence. The incidence angles of these plane waves are relevant for the waveguide modes occurring in the E-plane section.

Figure 8A:
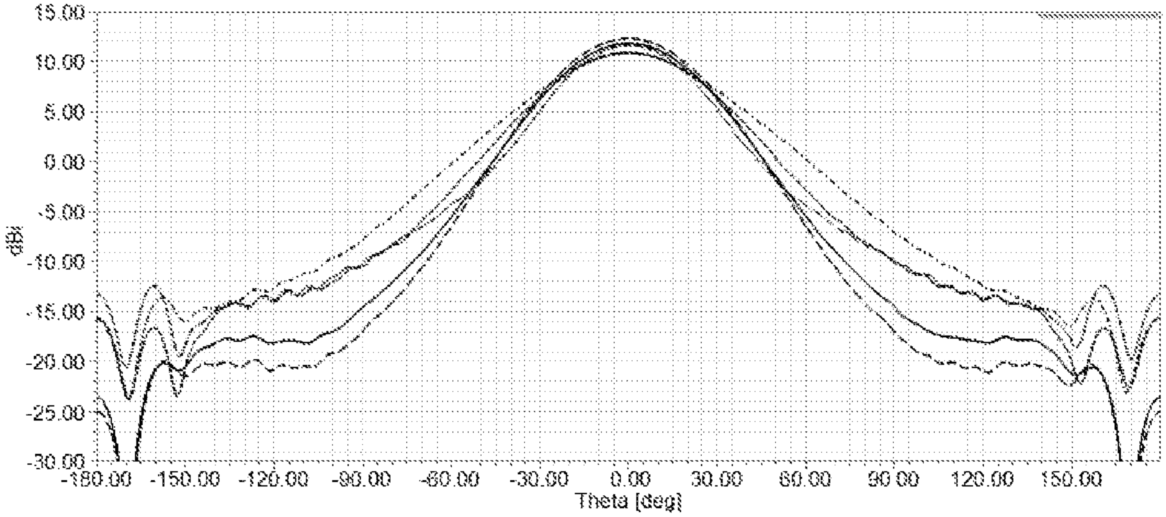
FIGS. 8*a* and 8*b* show the E-plane sum and difference radiation patterns for different frequencies within the upper band for the feed according to the disclosure.
Figure 8B:
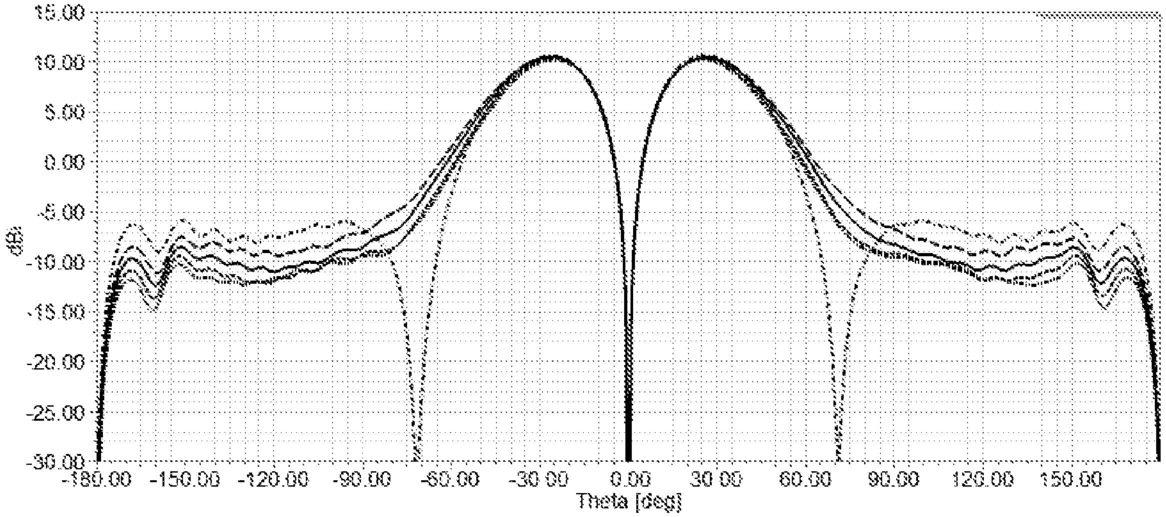

FIGS. 8*a* and 8*b* show the E-plane sum and difference radiation patterns for different frequencies within the upper band for the feed according to the disclosure. Each curve corresponds to a specific frequency within the band of operation. These radiation patterns are appropriate for feeding a reflector antenna system. Without the filter 16 being reflecting (and acting like a metallic wall) for these frequencies and relevant modes, the patterns would not be appropriate, nor would they be appropriate without the inductive diaphragms 19*a*, 19*b*, 19*c*, 19*d* and 19*e*.

Figure 9A:
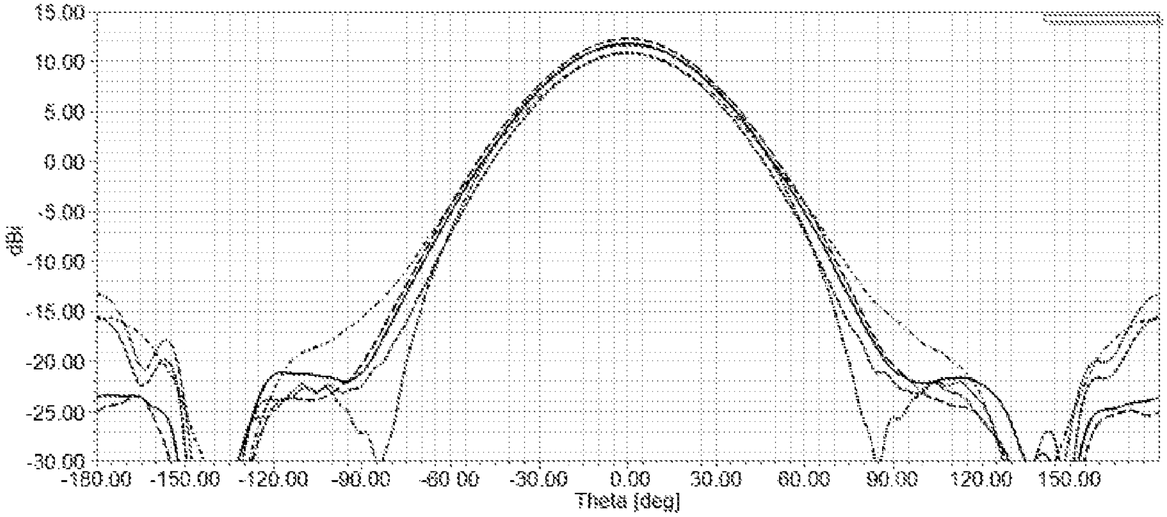
FIGS. 9*a* and 9*b* show the H-plane sum and difference radiation patterns for different frequencies within the upper band for the feed according to the disclosure.
Figure 9B:
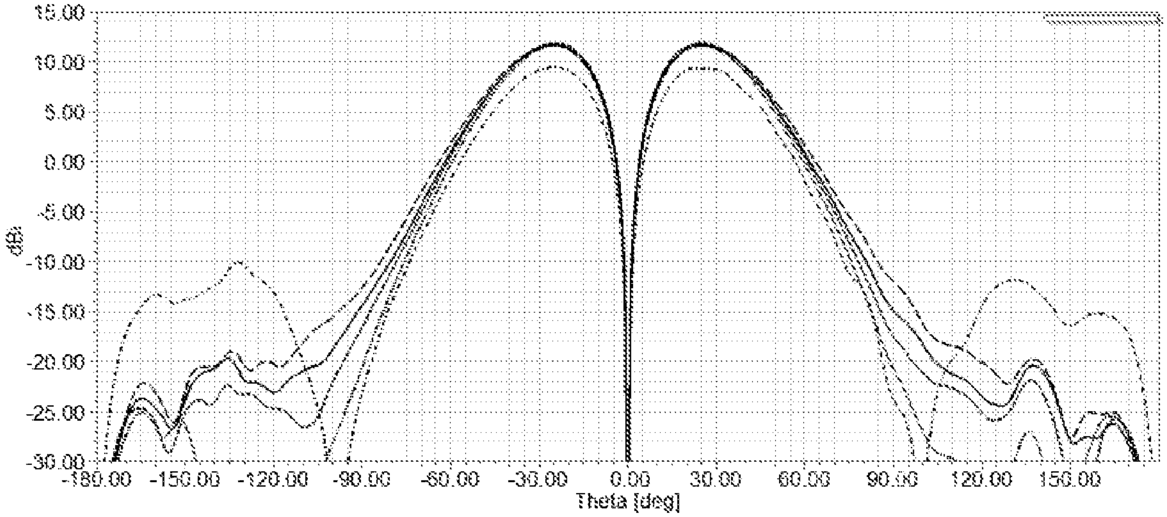

FIGS. 9*a* and 9*b* show the H-plane sum and difference radiation patterns for different frequencies within the upper band for the feed according to the disclosure. Each curve corresponds to a specific frequency within the band of operation. These radiation patterns are appropriate for feeding a reflector antenna system. Without the filter 16 being reflecting (and acting like a metallic wall) for these frequencies and relevant modes, the patterns would not be appropriate, nor would they be appropriate without the inductive diaphragms 19*a*, 19*b*, 19*c*, 19*d*, 19*e* and 24.

Figure 10A:
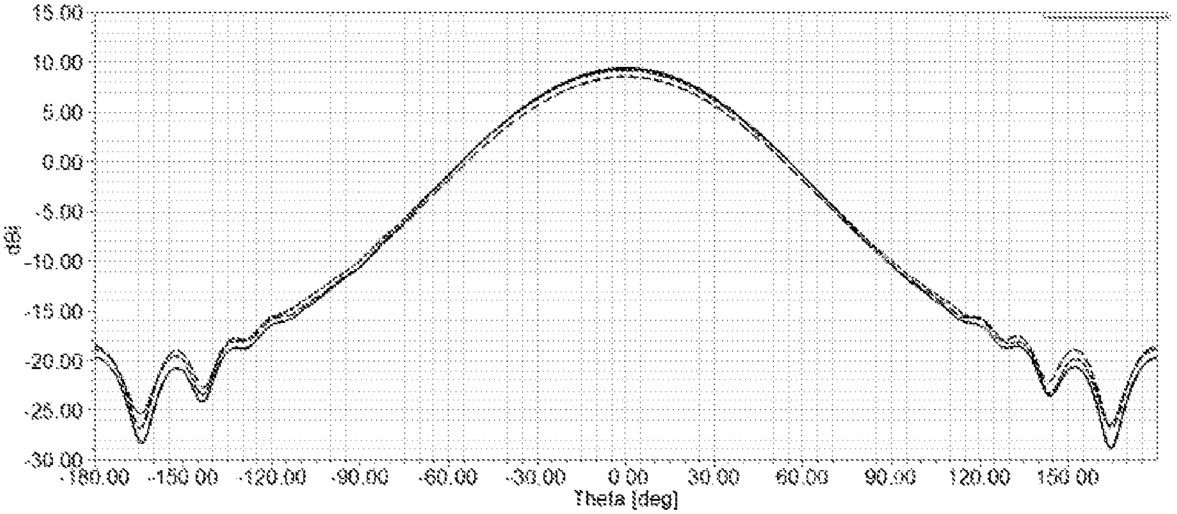
FIGS. 10*a* and 10*b* show the E-plane and H-plane radiation patterns for different frequencies within the lower band for the feed according to the disclosure.
Figure 10B:
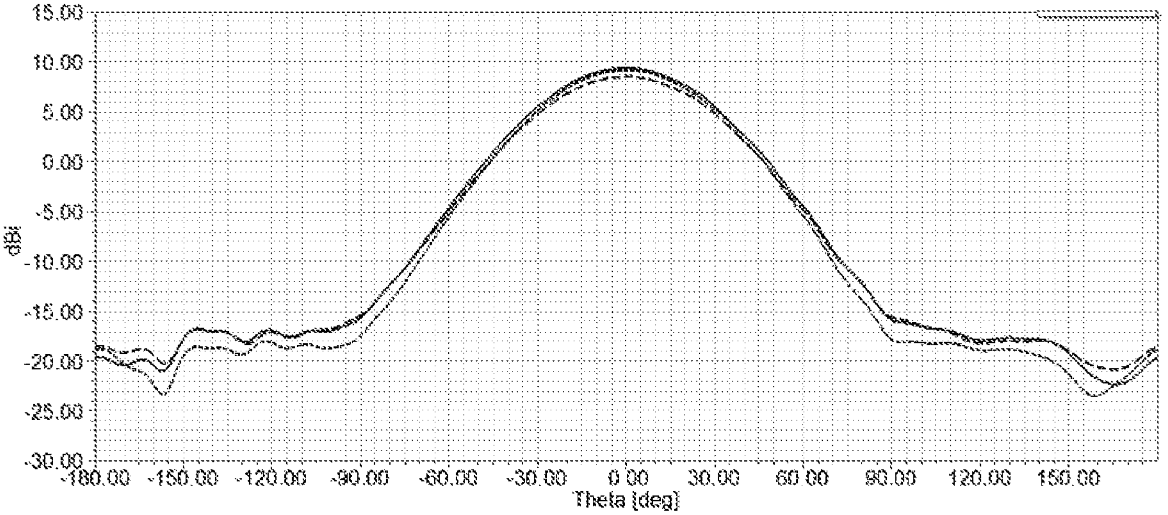

FIGS. 10*a* and 10*b* show the E-plane and H-plane radiation patterns for different frequencies within the lower band for the feed according to the disclosure. Each curve corresponds to a specific frequency within the band of operation. These radiation patterns are appropriate for feeding a reflector antenna system. Without the filter 16 being transparent for these frequencies and relevant modes, the patterns would not be appropriate.

Reference signs mentioned in the claims should not be seen as limiting the extent of the matter protected by the claims, and their sole function is to make claims easier to understand.

As will be realised, the invention is capable of modification in various obvious respects, all without departing from the scope of the appended claims. Accordingly, the drawings and the description are to be regarded as illustrative in nature, and not restrictive.

The invention claimed is:

1. A dual-band multimode antenna feed for a high-frequency band and a low-frequency band, the feed comprising four high-frequency waveguide ports, each high-frequency waveguide port being connected to a respective high-frequency input/output waveguide, each high-frequency input/output waveguide having a high-frequency waveguide aperture facing a first section for mixing electromagnetic modes in the E-plane, the first section being connected to a second section for mixing electromagnetic modes in the H-plane, wherein the feed further comprises a low-frequency waveguide port connected to a low-frequency input/output waveguide, wherein a low-frequency waveguide aperture faces the first section, and a filter is arranged inside the first section, the filter being arranged to be transparent for plane wave modes exhibited at lower frequencies and reflecting for plane wave modes exhibited at higher frequencies.

2. The antenna feed according to claim 1, wherein the filter is a plane-wave band-pass/band-stop filter.

3. The antenna feed according to claim 1, wherein the filter, comprises periodically repeating cells, at least one cell comprising electrically connected conducting patterns arranged on opposite sides of a dielectric sheet.

4. The antenna feed according to claim 3, wherein each conducting patterns is a cross with crossbars at its four ends surrounded by a rectangular frame.

5. The antenna feed according to claim 1, wherein the low-frequency waveguide port and low-frequency input/output waveguide are arranged centrally in the feed.

6. The antenna feed according to claim 1, wherein the aperture size of each high-frequency waveguide aperture of each high-frequency input/output waveguide facing the first section is reduced by an inductive diaphragm at a boundary of the first section.

7. The antenna feed according to claim 4, wherein the aperture size of the high-frequency waveguide apertures of the high-frequency input/output waveguides is reduced such that a cut-off frequency of the fundamental mode corresponding to the aperture size of the high-frequency waveguide apertures of the high-frequency input/output waveguides is higher than the upper frequency limit of the low-frequency band.

8. The antenna feed according to claim 5, wherein the cut-off frequency of the fundamental mode corresponding to the aperture size of the high-frequency waveguide apertures of the high-frequency waveguides is close to or within the high-frequency band.

9. The antenna feed according to claim 6, wherein the aperture size of the low-frequency waveguide aperture of the low-frequency input/output waveguide is reduced by an inductive diaphragm such that the cut-off frequency for the fundamental mode is above, within or just below the frequency band of operation for the low-frequency band.

10. The antenna feed according to claim 1, wherein an interface between the first section and the second section comprises inductive diaphragms.

11. A reflector antenna system comprising a polarization selective subreflector and a polarization twisting main reflector and an antenna feed according to claim 1.

12. A method of providing an antenna feed, the method comprises:

providing four high-frequency waveguide ports, each high-frequency waveguide port being connected to a respective high-frequency input/output waveguide, providing each high-frequency input/output waveguide with a high-frequency waveguide aperture facing a first section for mixing electromagnetic modes in the E-plane, providing a second section for mixing electromagnetic modes in the H-plane being connected to the first section, that wherein the method further comprises:

providing a low-frequency waveguide port connected to a low-frequency input/output waveguide, providing a low-frequency waveguide aperture facing the first section, arranging a filter inside the first section, where the filter is arranged to be transparent for plane wave modes exhibited at lower frequencies and reflecting for plane wave modes exhibited at higher frequencies.

13. The method according to claim 12, wherein the method comprises:

arranging the low-frequency waveguide port and low-frequency input/output waveguide centrally in the feed.

14. The method according to claim 12, wherein the method comprises:

reducing an aperture size of each high-frequency waveguide aperture of each high-frequency input/output waveguide facing the first section by arranging inductive diaphragms at a boundary of the first section.

15. The method according to claim 12, wherein the method comprises:

providing an interface between the first section and the second section with inductive diaphragms.

* * * * *